(12) United States Patent
Juneja

(10) Patent No.: US 10,217,463 B2
(45) Date of Patent: *Feb. 26, 2019

(54) HYBRIDIZED CLIENT-SERVER SPEECH RECOGNITION

(71) Applicant: SPEAK WITH ME, INC., Mountain View, CA (US)

(72) Inventor: Ajay Juneja, Mountain View, CA (US)

(73) Assignee: Speak With Me, Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/581,269

(22) Filed: Apr. 28, 2017

(65) Prior Publication Data

US 2017/0229122 A1    Aug. 10, 2017

Related U.S. Application Data

(63) Continuation of application No. 13/402,678, filed on Feb. 22, 2012, now Pat. No. 9,674,328.
(Continued)

(51) Int. Cl.
*G10L 15/30*    (2013.01)
*G10L 15/20*    (2006.01)
(Continued)

(52) U.S. Cl.
CPC ............ *G10L 15/22* (2013.01); *G10L 15/005* (2013.01); *G10L 15/02* (2013.01); *G10L 15/04* (2013.01);
(Continued)

(58) Field of Classification Search
CPC ......... G10L 15/20; G10L 15/30; G10L 15/32; G10L 15/193; G10L 25/60
(Continued)

(56) References Cited

U.S. PATENT DOCUMENTS 5,956,683 A    9/1999 Jacobs et al.
6,061,646 A    5/2000 Martino et al.
(Continued)

FOREIGN PATENT DOCUMENTS

EP    1617410         1/2006
GB    2383459    *    6/2003    ............. G10L 15/08
(Continued)

OTHER PUBLICATIONS

European Patent Office Summons to attend oral proceedings pursuant to Rule 115(1) EPC for European Application No. 12713809.7 dated Feb. 1, 2017, 7 pgs.
(Continued)

*Primary Examiner* — Martin Lerner
(74) *Attorney, Agent, or Firm* — Occhiuti & Rohlicek LLP

(57) ABSTRACT

A recipient computing device can receive a speech utterance to be processed by speech recognition and segment the speech utterance into two or more speech utterance segments, each of which can be to one of a plurality of available speech recognizers. A first one of the plurality of available speech recognizers can be implemented on a separate computing device accessible via a data network. A first segment can be processed by the first recognizer and the results of the processing returned to the recipient computing device, and a second segment can be processed by a second recognizer implemented at the recipient computing device.

20 Claims, 4 Drawing Sheets

Related U.S. Application Data

(60) Provisional application No. 61/445,433, filed on Feb. 22, 2011.

(51) Int. Cl.

| | | |
|---|---|---|
| *G10L 15/32* | (2013.01) | |
| *G10L 25/60* | (2013.01) | |
| *G10L 15/22* | (2006.01) | |
| *G10L 15/193* | (2013.01) | |
| *H04M 1/27* | (2006.01) | |
| *G10L 15/00* | (2013.01) | |
| *G10L 15/02* | (2006.01) | |
| *G10L 15/04* | (2013.01) | |
| *H04L 12/26* | (2006.01) | |
| *H04L 29/08* | (2006.01) | |
| *H04L 29/06* | (2006.01) | |
| *G10L 15/08* | (2006.01) | |
| *G10L 25/00* | (2013.01) | |
| *H04M 1/725* | (2006.01) | |

(52) U.S. Cl.
CPC ............ *G10L 15/193* (2013.01); *G10L 15/30* (2013.01); *G10L 15/32* (2013.01); *G10L 25/60* (2013.01); *H04L 43/0894* (2013.01); *H04L 67/327* (2013.01); *H04L 67/42* (2013.01); *H04M 1/271* (2013.01); *G10L 15/08* (2013.01); *G10L 25/00* (2013.01); *H04L 43/08* (2013.01); *H04M 1/7253* (2013.01); *H04M 1/72552* (2013.01); *H04M 2250/14* (2013.01); *H04M 2250/74* (2013.01)

(58) Field of Classification Search
USPC ...................... 704/231, 233, 236, 270.1, 255
See application file for complete search history.

(56) References Cited

U.S. PATENT DOCUMENTS

| | | | |
|---|---|---|---|
| 6,195,641 | B1 | 2/2001 | Loring et al. |
| 6,363,348 | B1 | 3/2002 | Besling et al. |
| 6,408,272 | B1 | 6/2002 | White et al. |
| 6,487,534 | B1 | 11/2002 | Thelen et al. |
| 6,526,380 | B1 | 2/2003 | Thelen et al. |
| 6,738,743 | B2 | 5/2004 | Sharma et al. |
| 6,757,655 | B1 | 6/2004 | Besling et al. |
| 7,146,321 | B2 | 12/2006 | Cyr et al. |
| 7,590,536 | B2 | 9/2009 | Bates et al. |
| 8,078,467 | B2 | 12/2011 | Wu et al. |
| 8,265,933 | B2 | 9/2012 | Bates et al. |
| 9,674,328 | B2 * | 6/2017 | Juneja ..................... G10L 15/30 |
| 2002/0046023 | A1 | 4/2002 | Fujii et al. |
| 2002/0077814 | A1 | 6/2002 | Garudadri et al. |
| 2002/0094066 | A1 | 7/2002 | Kato |
| 2002/0143551 | A1* | 10/2002 | Sharma .................. G10L 15/30 |
| | | | 704/270.1 |
| 2003/0105623 | A1 | 6/2003 | Cyr et al. |
| 2003/0120486 | A1 | 6/2003 | Brittan et al. |
| 2003/0125955 | A1 | 7/2003 | Arnold et al. |
| 2003/0182113 | A1 | 9/2003 | Huang |
| 2005/0240404 | A1 | 10/2005 | Gurram et al. |
| 2006/0009980 | A1 | 1/2006 | Burke et al. |
| 2006/0235684 | A1 | 10/2006 | Chang |
| 2007/0071206 | A1 | 3/2007 | Gainsboro et al. |
| 2007/0094270 | A1 | 4/2007 | Gallino et al. |
| 2007/0150283 | A1 | 6/2007 | O'Hagan |
| 2007/0225984 | A1 | 9/2007 | Milstein et al. |
| 2007/0276651 | A1 | 11/2007 | Bliss et al. |
| 2008/0027706 | A1 | 1/2008 | Odell et al. |
| 2008/0120094 | A1 | 5/2008 | Mate et al. |
| 2008/0154596 | A1 | 6/2008 | Da Palma et al. |
| 2008/0288252 | A1 | 11/2008 | Cerra et al. |
| 2008/0300871 | A1* | 12/2008 | Gilbert .................... G10L 15/20 |
| | | | 704/233 |
| 2009/0204409 | A1 | 8/2009 | Mozer et al. |
| 2009/0319267 | A1 | 12/2009 | Kurki-Suonio |
| 2011/0144973 | A1* | 6/2011 | Bocchieri ............. G06F 17/289 |
| | | | 704/251 |
| 2011/0153324 | A1 | 6/2011 | Ballinger et al. |
| 2012/0022869 | A1 | 1/2012 | Lloyd et al. |
| 2012/0035932 | A1* | 2/2012 | Jitkoff ..................... G10L 15/22 |
| | | | 704/254 |

FOREIGN PATENT DOCUMENTS

| | | |
|---|---|---|
| JP | H11175091 | 7/1999 |
| JP | 2001109486 | 4/2001 |
| JP | 2002539480 | 11/2002 |
| JP | 2002540477 | 11/2002 |
| WO | 2010025440 | 3/2010 |

OTHER PUBLICATIONS

Yoshida, H., Itsui, H., & Iwayama, H. (Jul. 25, 2009). Voice Logging Solution Using Speech Recognition Technology for Finance Business. Mitsubishi Electric Technical Report, 445. Retrieved from http://www.mitsubishielectric.co.jp/corporate/giho/0907/pdf/0907112.pdf.

International Preliminary Report on Patentability for International Application No. PCT/US2012/026185, dated Sep. 6, 2013, 8 pages.

Communication pursuant to Article 94(3) EPC for Application No. EP12713809.7, dated Aug. 12, 2014, 6 pgs.

Japan Patent Office (JPO) Office Action and Search Report of the General Industrial Property Cooperation Center in Japan for Application No. 2013-0554691 dated Feb. 23, 2016, 29 pgs. (machine translation from Global Dossier).

PCT International Search Report and Written Opinion dated May 25, 2012, for corresponding PCT application No. PCT/US2012/026185.

Japan Patent Office (JPO) Office Action for Application No. 2013-554691 dated Feb. 7, 2017, 3 pages.

Minutes of the Oral Proceedings before the Examining Division issued by the European Patent Office for Application No. 12713809.7, 12 pages, Nov. 24, 2017.

Communication under Rule 71(3) EPC, Intention to Grant, issued by the European Patent Office dated Jan. 29, 2018, for Application No. 12 713 809.7, 72 pages.

* cited by examiner

HYBRIDIZED CLIENT-SERVER SPEECH RECOGNITION

CROSS-REFERENCE TO RELATED APPLICATIONS

This application is a continuation application of, and claims priority to, U.S. patent application Ser. No. 13/402,678, now U.S. Pat. No. 9,674,328 issued Jun. 6, 2017, entitled "HYBRIDIZED CLIENT-SERVER SPEECH RECOGNITION," and filed Feb. 22, 2012, which claims priority to, and the benefit of, U.S. Provisional Patent Application No. 61/445,433, filed on Feb. 22, 2011, the contents of all of which are hereby incorporated by reference in their entireties.

TECHNICAL FIELD

The subject matter described herein relates generally to speech recognition and more particularly in some implementations to identification and apportionment of processing tasks associated with speech recognition functionality.

BACKGROUND

Speech recognition, which is also referred to in some contexts as automatic speech recognition, computer speech recognition, speech to text, or the like, generally refers to technology that can recognize speech and convert spoken words to text or to commands or directions to be followed by a computing system or systems. Speech recognition applications can include, but are not limited to, voice user interfaces such as voice dialing, call routing, control of building convenience or comfort features (e.g. lighting, appliances, climate control, entertainment, etc.), database searching (e.g. for either local databases or networked databases such as those accessible via a local area or wide area network such as the Intranet, data entry, preparation of structured documents, speech-to-text processing for transcription or composing of documents such as letters or e-mails or the like, hands-free computing, control of vehicle functions, or the like.

Speech recognition processes can be computationally and bandwidth (e.g. memory and data transmission) intensive. Speech recognizers designed for embedded devices, such as for example mobile phones and automotive car stereos and navigation systems, generally cannot handle as large of a vocabulary as speech recognizers hosted on servers. In addition, many embedded devices do not currently have the necessary processing power to run multiple speech recognizers simultaneously with real time recognition, particularly under demanding speech recognition conditions, such as less than optimal signal-to-noise ratio (e.g. high levels of environmental noise, acoustic distortion, etc.), support for the use of natural language under continuous speech conditions (e.g. to enable a person to talk to the speech recognizer without altering his or her speech pattern to assist the speech recognizer), support for a variety of languages and dialects, etc.

SUMMARY

In one aspect of the subject matter disclosed herein, a method, which can be implemented by one or more machines that includes programmable processors executing machine code or other software, can include receiving, at a recipient computing device, a speech utterance to be processed by speech recognition, segmenting the speech utterance into two or more speech utterance segments, and assigning each of the two or more speech utterance segments to one of a plurality of available speech recognizers. The assigning includes designating a first segment of the two or more speech utterance segments for processing by a first speech recognizer of the plurality of available speech recognizers that is implemented on a separate computing device than the recipient computing device and a second segment of the two or more speech utterance segments for processing by a second speech recognizer of the plurality of available speech recognizers that is implemented on the recipient computing device. The first segment is sent from the recipient computing device to the separate computing device for processing, and first segment processing results are received back from the separate computing device, for example via a data network. The second segment is processed at the recipient computing device to generate second segment processing results, and a completed speech recognition result that includes the first segment processing results and the second processing results is returned.

In optional variations of implementations of the current subject matter, one or more additional features, potentially including but not limited to the following, can be included in any feasible combination. The segmenting can optionally include initially analyzing the speech utterance using an acoustic model implemented on one or more processors at the recipient computing device. The initially analyzing can identify features of the received speech utterance that can be more efficiently processed by the separate computing device than the recipient computing device. The initially analyzing can optionally include determining a confidence score and an audio quality metric for at least one of the plurality of the two or more speech utterance segments. The assigning can optionally include designating the first segment for processing by the first speech recognizer implemented on the separate computing device when at least one of the confidence score and the audio quality metric are below respective threshold values. The respective threshold values can optionally be determined based on one or more criteria defined at design time or dynamically evaluated at run time. The recipient computing device can optionally include a thin client computing device or terminal, and the separate computing device can optionally include at least one server accessible over the data network from the thin client computing device or terminal. The assigning can optionally include designating the first segment for processing by the first speech recognizer implemented on the separate computing device when the first segment is determined by the initially analyzing to include one or more words that relate to data that are more readily accessible at the separate computing device than at the recipient computing device. The first segment processing results can optionally include analysis of the first segment performed by the separate computing device using an adapted language model. The adapted language model can optionally be adapted based on the data that are more readily accessible at the separate computing device than at the recipient computing device.

Systems and methods consistent with this approach are described as well as articles that comprise a tangibly embodied machine-readable medium operable to cause one or more machines (e.g., computers, etc.) to result in operations described herein. Similarly, computer systems are also described that may include a processor and a memory coupled to the processor. The memory may include one or more programs that cause the processor to perform one or more of the operations described herein.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Currently available systems and approaches for speech recognition and dialogue management typically utilize one instance of a speech recognizer, with a designated and fixed dictionary, one language, a fixed language model, and a fixed acoustic model. However, such approaches generally cannot satisfy all of the features that a user is likely to expect from a modern speech recognition application. For example, a client-side speech recognizer can deliver low latency and fast response times. A server-based speech recognizer can provide higher accuracy rates and a larger vocabulary, but may not always be available to respond to user demands due to data network availability or reliability issues. To address these and potentially other issues with currently available solutions, one or more implementations of the current subject matter provide methods, systems, articles or manufacture, and the like that can, among other possible advantages, allow for handling of larger vocabularies as well as dictionaries in multiple languages, and for taking advantage of processing power both at a thin client computing terminal via which a speech utterance is received or otherwise entered and in one or more servers accessible from the thin client computing terminal, for example over one or more network connections.

Some aspects of the current subject matter can involve processing a speech recognition utterance with a first part of the processing occurring on a thin client computing device or terminal and a second part of the processing occurring at one or more servers in communication with the thin client computing device or terminal over a network involving one or more of wired and wireless data transmissions. Multiple speech recognizers can optionally be utilized simultaneously, on either or both of the thin client computing device or terminal and the one or more servers. A dialogue manager can manage the results generated by the speech recognizers and can determine, based on those results, the most likely result to be returned as the recognized and converted speech. The dialogue manager can run on either of the thin client computing device or terminal or the one or more servers. Certain advantages can be realized in some implementations of the current subject matter by causing a thin client computing device or terminal to implement a dialogue manager or at least some aspects of dialogue manager functionality relating to segmenting a speech utterance and assigning tasks associated with the segmented speech utterance for processing at the one or more local processors of the thin client computing device or terminal or at the one or more remote servers.

Figure 1:
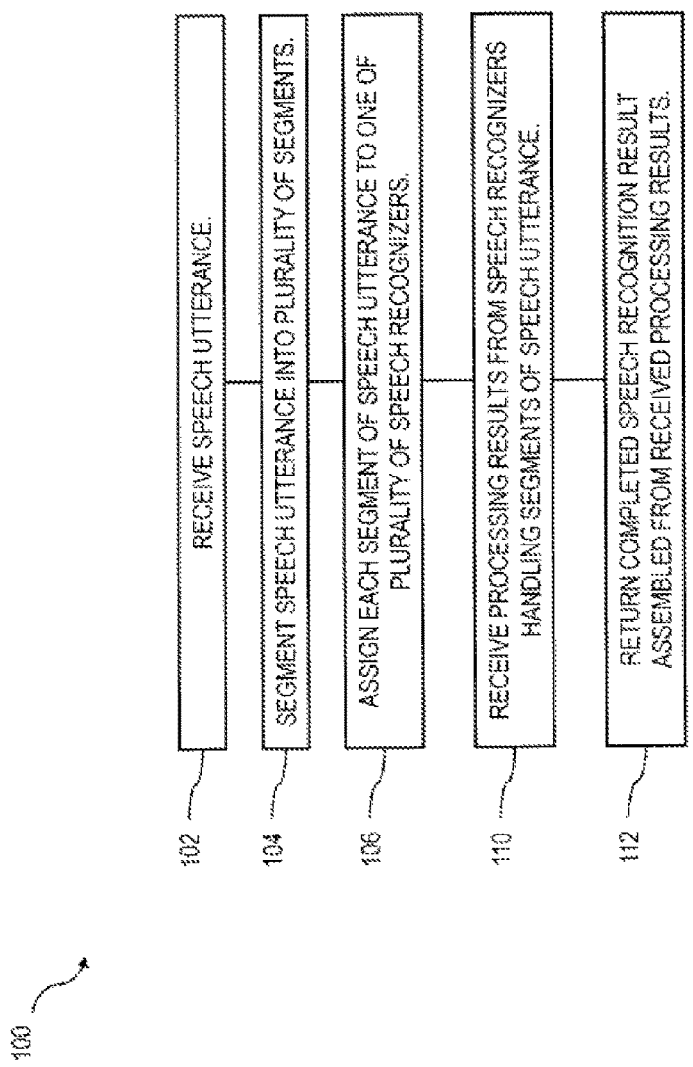
FIG. 1 is a process flow diagram illustrating aspects of a method having one or more features consistent with implementations of the current subject matter.

FIG. 1 shows a process flow chart 100 illustrating one or more features consistent with an implementation of the current subject matter. At 102, a dialogue manager receives a speech utterance, for example via audible input received at a thin client computing device or terminal as described elsewhere herein. As used herein, the term dialog manager refers generally to functionality provided by one or more of hardware and software that is capable of identifying receipt of a spoken utterance and performing one or more operations on that received utterance.

The dialogue manager segments the speech utterance into two or more (e.g. a plurality) of speech utterance segments at 104 and at 106 assigns each segment of the speech utterance to one of a plurality of speech recognizers. Each of the segmenting and the assigning can be performed according to one or more defined criteria, which are explained in greater detail elsewhere herein. Each of the plurality of speech recognizers can be individually configured, for example for one or more specific tasks or categories of tasks. Alternatively, one or more of the plurality of speech recognizers can be part of a pool of one or more dynamically configurable speech recognizers, which can be configured at run time to be executed at either the thin client computing device or terminal or on the one or more server systems to handle speech recognition tasks specific to the received speech utterance. Each speech recognizer instance can optionally be assigned to a particular language, and can have its own unique language model, grammar model, and acoustic model as discussed in greater detail below.

At 110, processing results are received, for example at the dialogue manager or other comparable functionality, from speech recognizers handling the plurality of segments, and at 112, a speech recognition result is returned. The returned speech recognition result can optionally generate or trigger further processing tasks by one or both of the thin client computing device or terminal and the one or more servers.

Figure 2:
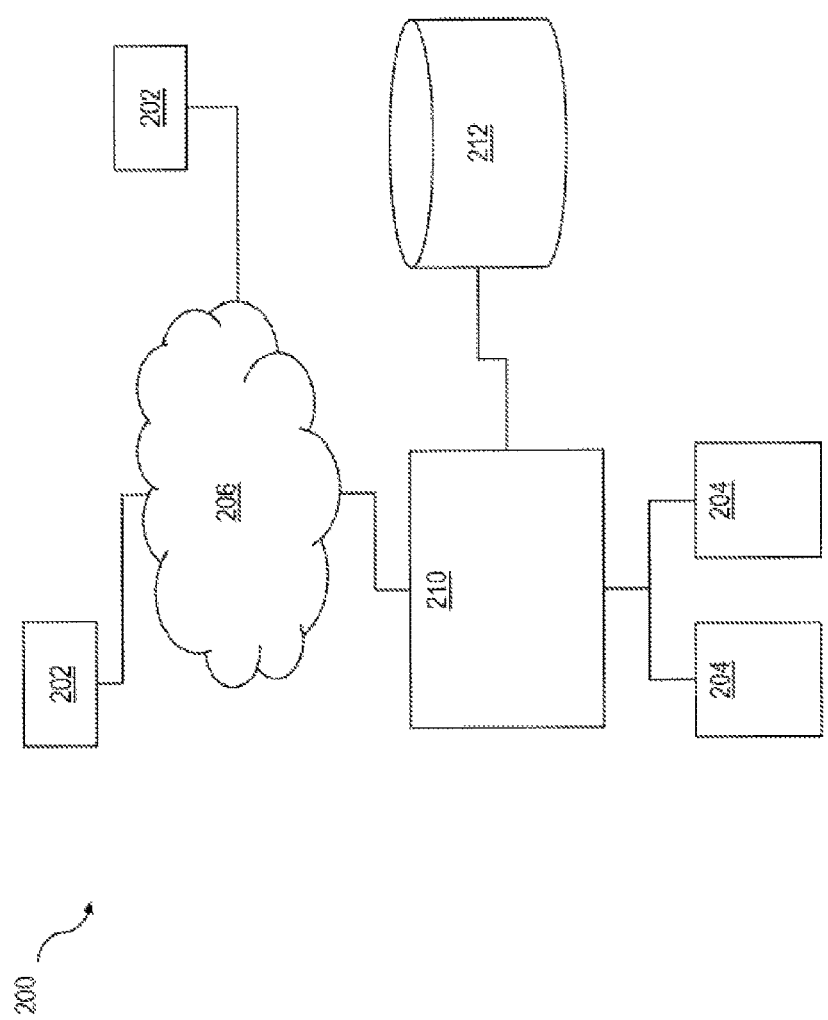
FIG. 2 is a diagram illustrating system features consistent with at least some implementations of the current subject matter.

FIG. 2 shows an example of a system architecture 200 consistent with one or more features of the current subject matter. A thin client computing device or terminal 202 can access one or more server systems 204 via a network 206, which can include one or more of wired and wireless communication capabilities. The one or more server systems 204 can, in some implementations, be accessed via a backend interface 210 that can distribute processing loads across the one or more server systems 204. Alternatively, each of multiple cloud servers 204 can be directly accessible over the network via its own back end interface. The server systems 204 can have access to online data storage 212, for example a database or databases, which can be directly accessible from one or all of the server system 204 or, as shown in FIG. 2, via the backend interface 210. Any or all of the one or more server systems 204, the backend interface 210, and the online data storage 212 can include all or part of a cloud computing arrangement. For example, dynamically scalable resources, which can include physical and/or virtual machines, can be accessed over a network (e.g. a local intranet, the Internet, or the like) to enable distributed handling of processing tasks. Multiple thin client computing devices or terminals 202 can access the networked computing capabilities of the one or more servers 204 in parallel.

A thin client computing device or terminal 202 can, as noted elsewhere herein, include a mobile device or other computing device with network access. Such devices can include, but are not limited to a cellular telephone, a "smart" phone, a personal data assistant, a tablet computing device, an e-reader, an navigation assistant, a processor in an automobile or other vehicle that implements a user interface with voice recognition features, a desktop personal computer or laptop computer, a household or office control system that implements a user interface with voice recognition features, or any other comparable device or system with which a user can interact using voice commands. Such a device, which can include at least one programmable processor, can implement on that at least one programmable processor a locally implemented user acoustic model. This locally implemented user acoustic model can include the ability to be trained over time by receiving user feedback on speech recognition results. For example, a user can be given the opportunity via a user interface and one or more input devices (e.g. a keyboard, a mouse, a touch screen, a trackpad, voice commands, or the like) interacting with the user interface to review and modify speech recognition results to indicate "correct" or "corrected" speech recognition results. Such inputs can serve as training feedback to a locally implemented user acoustic model to better refine initial recognition results provided by the speech recognition features implemented on one or both of the thin client computing device or terminal 202 and the one or more server 204.

Figure 3:
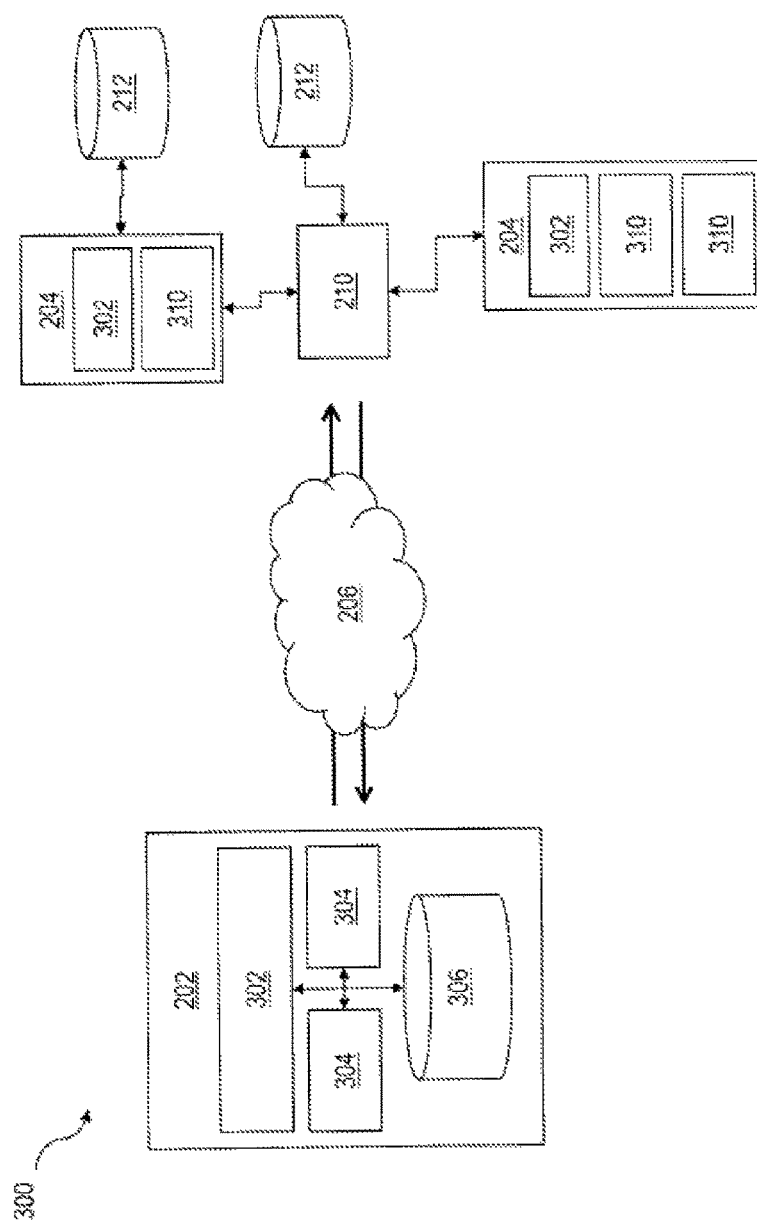
FIG. 3 is a diagram illustrating additional system features consistent with at least some implementations of the current subject matter.

FIG. 3 shows another computing architecture diagram illustrating one or more features consistent with at least one implementation of the current subject matter. In some implementations, the thin client computing device or terminal 202 can include one or more programmable processors 302 that execute one or more client-side modules 304 providing speech recognition functionality and that access one or more local databases 306 storing data content relevant to recognition of speech utterances encountered at the thin client computing device or terminal 202. Advantageously, at least one of the client-side modules 304 includes a local speech recognizer based on a context-free grammar (CFG). Additional client-side modules 304 can include, but are not limited to, a user acoustic model, a client-server dialogue manager, an adaptive language model (LM), and the like. The local databases can optionally include data content such as grammars cached for use with location based service (LBS) data, all or a subset of e-mails and other text-based messages (e.g. SMS messages) sent and/or received by a user or users of the device, contacts lists and/or other address book data, at least some portion of a user's (or users') calendar data (e.g. appointments, task lists, etc.), media content (e.g. music, videos, photos, and the like), time and location data (e.g. both current and historical), data regarding social relationships of a user or users of the device (e.g. friend lists or the like for social media service providers), proximity data relating to social relationships (e.g. social media friend proximity maps, etc.), and the like. The term grammar as it pertains to speech recognition generally denotes types of constraint on word sequences that are within the recognition capability of the speech recognizer. A grammar can cover not only lexical and syntactic rules, but also semantic and pragmatic constraints, for example as might be defined or parameterized by a specific speech recognition task.

Also as shown in the diagram 300 of FIG. 3, each of the one or more servers 204 can include programmable processors 302 that execute one or more server-side modules 310 that support one or more aspects of the overall speech recognition functionality. For example, server-side modules 310 can include without limitation an acoustic model that is synchronized to the server 204; a speech recognizer module based on a statistical language module, a server-side dialogue manager module, an adapted language model that is either or both of time and location sensitive; an adapted language model and statistical language model (SLM) used in parallel; an adapted language model constructed from one or more of user e-mail, location-based service data for a user, point of interest data, social media feeds, calendar appointments, cloud media content, cloud-stored documents, and the like; etc. User-specific data can be used unfiltered with all available data considered, or one or more algorithms can be applied as part of the adapted language model to, for example, filter such data by age, relevance determined according to one or more predefined or derived criteria, etc. A user acoustic model can be trainable over time based on available data. In some examples, an adapted language model can be both time and location sensitive.

Portions of tasks relating to speech recognition process can involve data that are retained or otherwise stored (for example in a magnetic, optical, or solid state storage device or the like); in random access memory (RAM), read-only memory (ROM), or the like, on a subscriber identification module (SIM) card or the like; on a removable storage device such as a secure digital (SD) card, a secure digital extended capacity card, etc.; or other magnetic, optical, solid state, etc. devices that are integrated within, directly attachable to or within, or otherwise accessible over a high speed networked connection (e.g. a local area network such as WiFi, a Bluetooth connection, an infrared data link, or the like) from the thin client computing device or terminal 202. Such data can include, but are not limited to contacts, calendar items, video games, locally stored e-mail messages, and the like. Speech recognition tasks relating to such data can in some implementations be most efficiently processed at a thin client computing device or terminal 202.

Portions of tasks that are more computationally intensive or that involve access to data that are more readily accessible to one or more servers or other cloud computing systems can in some implementations be processed on the server side. Such tasks can include, but are not limited to dictation of the body of an email or text message, accessing a music or video collection stored online (e.g. in the cloud), tasks that involve determining an acoustic profile for a user, tasks that involve using multiple speech recognizers at once in different languages, and the like. In some implementations, tasks that involve using multiple speech recognizers at once in different languages can be processed on either or both of the server side and the thin client computing device, depending on, for example, the processing power of the thin client computing device, the quality of the available network connection, network bandwidth limitations, and the like.

Depending upon the nature of an application that invokes a speech recognizer or other speech recognition functionality consistent with the current subject matter, a dialogue script designer, developer, or development team can decide or otherwise define, for example during design time (e.g. prior to run time), at what point within a received utterance a switch should be made between processing of speech recognition-related tasks at the thin client (e.g. the mobile device) and the server or servers. One or more algorithms, evaluations or one or more runtime parameters or other variables, decision points, or the like can be included within the runtime version of the application or within the software or hardware implementing the speech recognizer or other speech recognition functionality to parse a received utterance into two or more parts (e.g. phrases, sections, etc.) and to assign these parts for processing at either or both of the thin client computing device and one or more servers accessed over a network.

Also possible within one or more implementations of the current subject matter is the ability to switch between languages mid-sentence or elsewhere within a single speech utterance, and/or to use multiple speech recognizers in the same language in parallel to boost the accuracy rate and/or determine an appropriate acoustic profile and fundamental frequency for the speaker who has created the speech utterance. Using such approaches, learning and optimizing the profile for each speaker (e.g. a user of the speech recognition functionality can be improved). A decision regarding how to define a switch point between languages, divisions of a speech utterance, use of multiple speech recognizers in parallel, etc. can be made at design time (e.g. pre-programmed into the dialogue manager). Alternatively, a dialogue manager can be programmed with one or more routines or algorithms, such as logic, fuzzy logic, artificial intelligence, or the like, that can be executed at run time to determine how a speech utterance is to be segmented. The dialogue manager, within its modeling language, can be capable of making decisions based upon the results given back, and the decisions made can be specific to the tasks and applications at hand.

In an illustrative example of some feature consistent with implementation of the current subject matter, a sample sentence received as a speech utterance can be "Send a text message to Mike Smith and tell him to wash the dishes." This sentence can be broken up in to a first segment to be handled by a first speech recognizer at the thin client computing terminal and a second segment to be handled by a second speech recognizer at the one or more servers. The first segment can include the first part of the utterance including the command to send an SMS message and the intended recipient's name. The second segment can include the additional information to be included in the text message. For example, speech recognizer A at the thin client computing terminal can be assigned the recognition tasks of <sendSMS> and <person name> while speech recognizer B at the one or more servers can be assigned the recognition tasks of <SLM: dictation>. These recognition tasks can be defined as follows: <sendSMS> can identify one or more verbal utterance segments such as "Send a text message to", "Send a message to", "Send an SMS to" or the like as indicating a command to send a text message. The <person name> recognition task can in one example search contacts stored in a dictionary or contact list on the thin client computing device.

In an example, the first portion of the sample phrase can be modeled as a context-free grammar (CFG) on the device, and the second portion of the sentence can use a statistical language model (SLM) based recognizer hosted at one or more servers, or "in the cloud." A context-free grammar can provide a simple and mathematically precise mechanism for describing methods by which phrases in natural language are built from smaller blocks. This approach can enable capturing the "block structure" of sentences in a natural way and can also support efficient parsing algorithms, which, can determine for a given string of words whether and how the string of words are generated from the grammar. A SLM generally assigns a probability to a sequence of words for use in estimating the distribution of natural language. For example, a SLM can include a probability distribution P(s) over strings S that attempts to reflect how frequently a string S occurs as a sentence. Such models typically attempt to capture the properties of a language, and to predict the next word in a speech sequence based on one or more words preceding a target word in a speech utterance.

Following a scripting format such as that discussed above, any combination of portions of spoken dialogue can be designated as object-oriented fragments that can be freely intermixed between context-free-grammars on the client, context-free-grammars at one or more servers or on the cloud, statistical language modeling on the client, and statistical language modeling at one or more servers or on the cloud, all within the same speech utterance. This design can enable development flexibility to achieve the highest possible speed and accuracy out of the spoken language portion of a user interface. In addition, as speech recognition at one or more servers (e.g. in the cloud) can be computationally expensive, intelligent use of the approaches described herein can in some implementations allow for savings of up to 70% or more of the data bandwidth use while also insuring a faster round trip response time for the user.

Another example of speech utterance response types utilizing an approach consistent with implementations of the current subject matter can include recognition at the thin client computing device or terminal 202 of a "play" command with server-side recognition of a song, artist, playlist, etc. corresponding to an audio, video, etc. feed available to be streamed over a network from the one or more servers or the cloud to the thin client computing device. For example, actions in this scenario can be summarized as <client: recognizer A><play></client:recognizer A><cloud:recognizer B><musicstreamingfromcloud></cloud:recognizer B> where <play> is defined as a verbal string such as "Play", "Play for me", "could you please play", or the like.

Data on the server side can include, but is not in any way limited to e-mails, text messages, calendar entries, "to-do" or other task list entries, social media feeds (including for example feeds from Facebook®, Twitter®, Google+®, LinkedIn®, or the like), music collections or streaming music or other media sources available from the cloud or other online sources, etc. A server-side module providing an adapted language model can use one or more of such data sources as well as other data sources to construct and refine the adapted language model.

Recent data can be pushed or otherwise transferred (e.g. via a periodic pull, an update process, or the like) to the thin client computing device or terminal 202 in a data transfer process supporting a greater range of speech recognition features without a need for network connectivity. In one example, such data transfer processes can be performed in the background when other network activities are low. A user can optionally adjust settings to determine when such transfers should occur. For example, a user with a limited cellular data service plan may choose to have such data transfers performed only when his or her phone or other thin client computing device or terminal 202 is connected to a non-cellular network, such as by a WiFi (e.g. over a network based on a 802.11_protocol) connection or hard-wired connection. Grammars can also optionally be dynamically constructed using available data both on the one or more servers 204 and at the thin client computing device or terminal 202.

Figure 4:
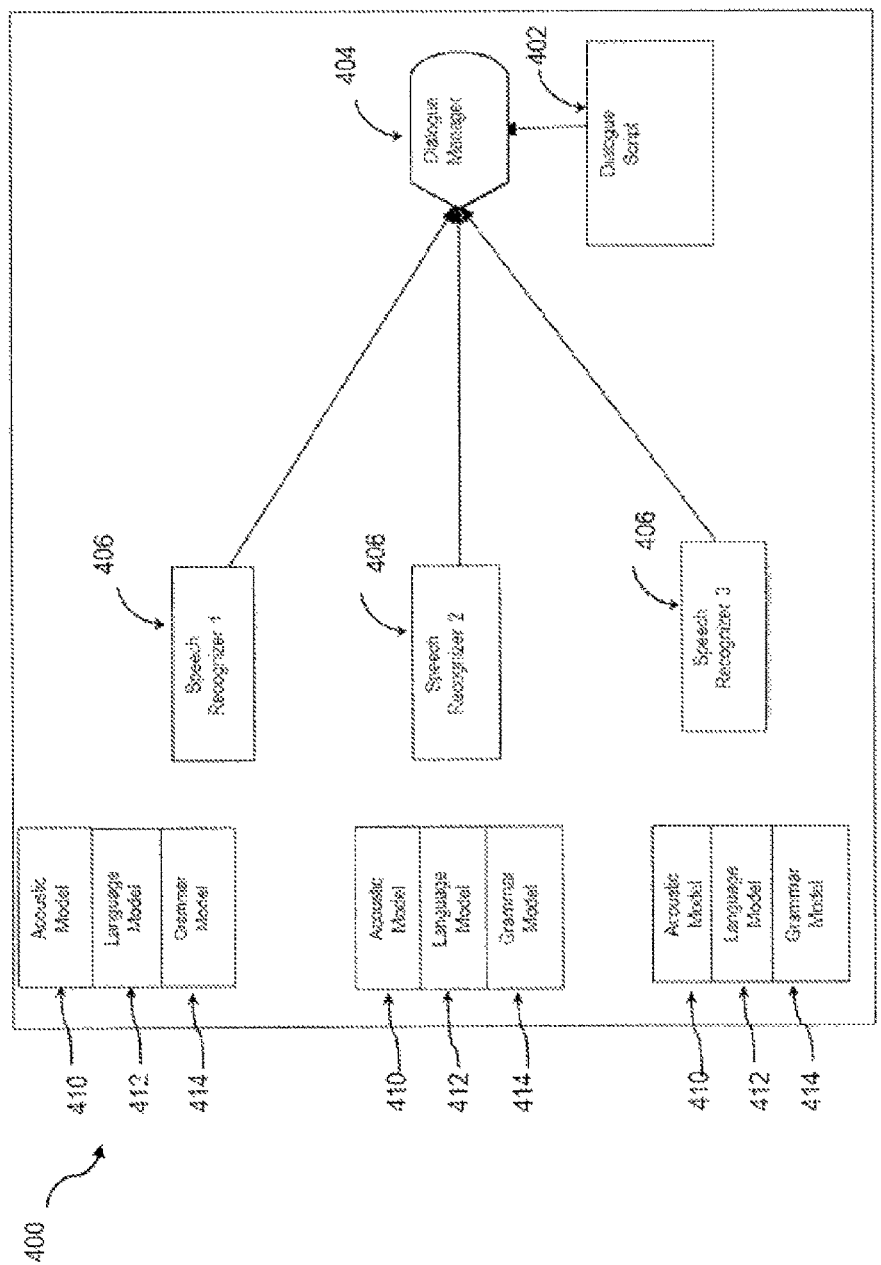
FIG. 4 is a diagram illustrating software architecture features consistent with at least some implementations of the current subject matter.

As illustrated in the component diagram 400 of FIG. 4, a dialogue script 402, which can be prepared by a developer, defines a set or sets of tasks and vocabularies for a dialogue manager 404. The dialogue manager 404 can be connected to multiple different speech recognizers 406 at the same time. It should be noted that, while three speech recognizers 406 are depicted in FIG. 4, any number of speech recognizers is possible and within the scope of the current subject matter. A speech recognizer 406 as described herein can contain an acoustic model 410, a language model 412, and a grammar model 414.

Based on a design time understanding or prediction of the nature of the speech recognition demands likely to be experienced by a speech recognition system consistent with one or more implementations of the current subject matter, the dialogue script 402 can include one or more algorithms or criteria that assist in deciding which speech recognizer 406 to use to process each specific portion of a detected verbal utterance. The dialogue manager 404 and dialogue script 402 can, in various implementations, reside on the one or more servers 204 (e.g. in "the cloud"), on a thin client computing terminal 202, or at least partially at both the thin client computing device or terminal 202 and the one or more servers 204.

In various implementations, one or more of the speech recognizers 406 can be in the same language or in different languages. The speech recognizers 406 can exist on a single device or on multiple different devices. One or more of the speech recognizers 406 can contain a unique acoustic model 410. Alternatively, one or more of the speech recognizers 406 can contain the same acoustic model 410. Similarly, one or more of the speech recognizers 406 can contain a unique language model 412. Alternatively, one or more of the speech recognizers 406 can contain the same language model 412. Furthermore, one or more of the speech recognizers 406 can contain a unique grammar model 414. Alternatively, one or more of the speech recognizers 306 can contain the same grammar model 414. Also, one or more of the speech recognizers 306 can contain a unique dictionary. Alternatively, one or more of the speech recognizers 306 can contain the same dictionary.

The number of speech recognizers used can be dynamically decided based on client demand and device load. The state of the system can be transferred from the thin client computing device or terminal 202 to the one or more servers 204 and/or from the one or more server 204 back to the thin client computing terminal 202. The acoustic model of the thin client computing device or terminal 202 can be dynamically adapted, which can in some examples include the use of locally available data (e.g. e-mail and text message content, recipients, and senders; time and location data for the thin client computing device or terminal 202; calendar content; media content; social media content; and other similar data including those discussed elsewhere herein. Adapted language models used at the one or more servers 204 can also make use of data that are readily available in storage 212 or otherwise accessible to the one or more servers 204.

Division of speech recognition processing tasks between the thin client computing device or terminal 202 and the one or more servers 204 can be determined based on one or more factors as noted above. In some examples, design-time algorithms or definitions of run time parameter assessments can be provided to assist in dividing tasks between client and server. In one example, a confidence score and a signal-to-noise ratio can be assigned to each of one or more segments of a received speech utterance. The signal-to-noise ratio can be an indicator or otherwise used as metric representative of a quality of the audio signal of the received speech utterance. A initial analysis performed using an acoustic model processing the received speech utterance at the thin client computing device or terminal 202 can provide the confidence score in some examples. One or more threshold values can be pre-defined for both of the confidence score and the signal-to-noise ratio or other audio quality metric. For a segment of a received speech utterance having a confidence score and an audio quality metric above their respective thresholds, the segment can be assigned for processing at the thin client computing device or terminal 202. On the other hand, a segment with a low confidence score (e.g. below a predefined confidence score threshold), can optionally be assigned for processing at the one or more servers 204 regardless of the signal to noise ratio.

Threshold settings for both the confidence level and the audio quality metric can optionally be determined based on an expected or actual environment in which the speech utterance occurs or is received as well as the type of equipment or devices used to receive the speech utterance. For example, an environment with large amounts of background or ambient noise, such as an automobile, a public venue, etc., can have a different threshold assigned than a quieter environment with lower expected background noise, such as a home, an office, or the like. A thin client computing device or terminal 202 or other speech utterance receiving device can be classified based on the existence of noise canceling devices, a number of microphones, etc. and the thresholds for determining high or low confidence scores and/or acoustic quality metrics can be adjusted accordingly. Similarly, the type of verbal inputs expected to be received and processed by the speech recognition functionality can be used in determining appropriate thresholds, as can the availability of necessary data for use in adapted language models, availability and cost of network access and bandwidth, and the like. In some examples, a speech utterance segment having a signal to noise ratio of less than a minimum threshold (e.g. approximately 40 db) can be identified as having a quality too poor to be useful, while a second speech utterance having a signal to noise ratio of greater than the minimum threshold but below a next threshold (e.g. approximately 60 db) can be identified as having low quality necessitating processing at the one or more servers 204, where greater processing power is available. A third speech utterance segment having a signal to noise ratio of greater than the next threshold (e.g. approximately 60 db) can be identified as having high quality permitting processing at the thin client computing device or terminal 202 as less processing power is expected to be necessary.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like. A computer remote from an analyzer can be linked to the analyzer over a wired or wireless network to enable data exchange between the analyzer and the remote computer (e.g. receiving data at the remote computer from the analyzer and transmitting information such as calibration data, operating parameters, software upgrades or updates, and the like) as well as remote control, diagnostics, etc. of the analyzer.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method comprising:
   receiving, at a recipient computing device, a speech utterance;
   dynamically determining a confidence threshold value and an audio quality threshold value based on environmental conditions at which the recipient computing device is located, the environmental conditions comprising one or more of: a type of environment in which the recipient computing device is located, availability of noise cancelling devices at the recipient computing device, and number of microphones used by the recipient computing device;
   segmenting the speech utterance into two or more speech utterance segments, including performing an initial analysis on the speech utterance, to determine where to perform speech recognition processing for each of the two or more speech utterance segments, by applying to the speech utterance a dynamically adaptable acoustic model implemented at the recipient computing device, with the dynamically adaptable acoustic model adjusted based on locally available data at the recipient computing device, including a user location and time, to determine a confidence score and an audio quality metric for each of the two or more speech utterance segments;
   assigning, based on the initial analysis performed by the adaptable acoustic model generating the determined confidence score and audio quality metric for the each of the two or more speech utterance segments, and based on the dynamically determined confidence threshold and the audio quality threshold, a first segment from the two or more speech utterance segments to a first speech recognizer implemented on a separate computing device than the recipient computing device, and a second segment from the two or more speech utterance segments to a second speech recognizer implemented on the recipient computing device;
   sending the first segment from the recipient computing device to the separate computing device for processing;
   receiving first segment processing results back from the separate computing device, the sending and the receiving occurring via a data network;
   processing the second segment at the recipient computing device to generate second segment processing results; and
   returning a completed speech recognition result assembled from the first segment processing results and the second segment processing results.

2. The method of claim 1, wherein assigning the first segment and the second segment comprises:
   designating the first segment for processing by the first speech recognizer when at least one of the confidence score and the audio quality metric for the first segment, determined using the dynamically adaptable acoustic model, is below the respective confidence threshold value and the audio quality threshold value; and
   designating the second segment of the two or more speech utterance segments for processing by the second speech recognizer when another confidence score and another audio quality metric for the second segment, determined using the dynamically adaptable acoustic model, is above the respective confidence threshold value and the audio quality threshold value.

3. The method of claim 1, further comprising:
   determining an amount of an available bandwidth between the recipient computing device and the separate computing device;

wherein segmenting the speech utterance further comprises:
segmenting, upon determining that the available bandwidth is sufficient, the speech utterance into the two or more speech utterance segments, including performing the initial analysis for further identifying features of the speech utterance that can be more efficiently processed by the separate computing device than the recipient computing device.

4. The method of claim 3, wherein identifying of the features of the speech utterance comprises:
determining processing speeds associated with the separate computing device and the recipient computing device, the available bandwidth, and a presence of a word or phrase capable of being efficiently modeled by a context-free grammar at the recipient computing device.

5. The method of claim 3, wherein initially analyzing the speech utterance by identifying the features of the speech utterance that can be more efficiently processed by the separate computing device than the recipient computing device comprises:
identifying a feature of the speech utterance as commands-based speech data corresponding to the second segment to be processed at the second speech recognizer implemented at the recipient computing device; and
identifying another feature of the speech utterance as additional information, including one or more of dictation data, music or video data, user acoustic profile data, or foreign language speech data, the additional information being related to the identified command-based speech data corresponding to the second segment, with the other feature of the speech utterance to be processed at the first speech recognizer implemented on the separate computing device.

6. The method of claim 3, wherein identifying the features of the speech utterance comprises:
analyzing the speech utterance using the dynamically adaptable acoustic model implemented on one or more processors at the recipient computing device.

7. The method of claim 3, wherein assigning each of the two or more speech utterance segments further comprises:
designating the first segment for processing by the first speech recognizer implemented on the separate computing device when the first segment is determined by the initially analyzing to include one or more words that relate to data that are more readily accessible at the separate computing device than at the recipient computing device.

8. The method of claim 1, wherein sending the first segment from the recipient computing device to the separate computing device for processing comprises:
sending the first segment from the recipient computing device to the separate computing device for processing using an adapted language model that is one or more of: time sensitive, and location sensitive;
wherein the second segment is processed by a local language model implemented at the recipient computing device.

9. The method of claim 1, wherein the respective threshold values are determined based on one or more criteria defined at design time or dynamically evaluated at run time.

10. The method of claim 1, wherein the recipient computing device comprises a thin client computing device or terminal, and the separate computing device comprises at least one server accessible over the data network from the thin client computing device or terminal.

11. A recipient computing device comprising:
at least one programmable processor;
a communication unit to communicate with remote computing devices; and
a computer-readable storage medium, coupled to the at least one processor and the communication unit, storing instructions that, when executed by the at least one processor, cause the at least one programmable processor to:
receive a speech utterance;
dynamically determine a confidence threshold value and an audio quality threshold value based on environmental conditions at which the recipient computing device is located, the environmental conditions comprising one or more of: a type of environment in which the recipient computing device is located, availability of noise cancelling devices at the recipient computing device, and number of microphones used by the recipient computing device;
segment the speech utterance into two or more speech utterance segments, including to perform an initial analysis on the speech utterance, in order to determine where to perform speech recognition processing for each of the two or more speech utterance segments, so as to apply to the speech utterance a dynamically adaptable acoustic model implemented at the recipient computing device, with the dynamically adaptable acoustic model adjusted based on locally available data at the recipient computing device, including a user location and time, to determine a confidence score and an audio quality metric for each of the two or more speech utterance segments;
assign, based on the initial analysis performed by the adaptable acoustic model generating the determined confidence score and audio quality metric for the each of the two or more speech utterance segments, and based on the dynamically determined confidence threshold and the audio quality threshold, a first segment from the two or more speech utterance segments to a first speech recognizer implemented on a separate computing device than the recipient computing device, and a second segment from the two or more speech utterance segments to a second speech recognizer implemented on the recipient computing device;
send the first segment from the recipient computing device to the separate computing device for processing;
receive first segment processing results back from the separate computing device, the sending and the receiving occurring via a data network;
process the second segment at the recipient computing device to generate second segment processing results; and
return a completed speech recognition result assembled from the first segment processing results and the second segment processing results.

12. The recipient computing device of claim 11, wherein the instructions to cause the at least one programmable processor to assign the first segment and the second segment comprise one or more instructions to cause the at least one programmable processor to:
designate the first segment for processing by the first speech recognizer when at least one of the confidence score and the audio quality metric for the first segment, determined using the dynamically adaptable acoustic model, is below the respective confidence threshold value and the audio quality threshold value; and designate the second segment of the two or more speech utterance segments for processing by the second speech recognizer when another confidence score and another audio quality metric for the second segment, determined using the dynamically adaptable acoustic model, is above the respective confidence threshold value and the audio quality threshold value.

13. The recipient computing device of claim 11, wherein the instructions comprise further instructions to cause the at least one programmable processor to:

determine an amount of an available bandwidth between the recipient computing device and the separate computing device;

wherein the instruction to cause the at least one programmable processor to segment the speech utterance further comprises one or more instructions to:

segment, upon determining that the available bandwidth is sufficient, the speech utterance into the two or more speech utterance segments, including to perform the initial analysis to further identify features of the speech utterance that can be more efficiently processed by the separate computing device than the recipient computing device.

14. The recipient computing device of claim 13, wherein the one or more instructions to cause the at least one programmable processor to identify the features of the speech utterance comprises instructions to cause the at least one programmable processor to:

determine processing speeds associated with the separate computing device and the recipient computing device, the available bandwidth, and a presence of a word or phrase capable of being efficiently modeled by a context-free grammar at the recipient computing device.

15. The recipient computing device of claim 13, wherein the instructions to cause the at least one programmable processor to initially analyze the speech utterance to identify the features of the speech utterance that can be more efficiently processed by the separate computing device than the recipient computing device comprises instructions to cause the at least one programmable processor to:

identify a feature of the speech utterance as commands-based speech data corresponding to the second segment to be processed at the second speech recognizer implemented at the recipient computing device; and identify another feature of the speech utterance as additional information, including one or more of dictation data, music or video data, user acoustic profile data, or foreign language speech data, the additional information being related to the identified command-based speech data corresponding to the second segment, with the other feature of the speech utterance to be processed at the first speech recognizer implemented on the separate computing device.

16. The recipient computing device of claim 11, wherein the instructions to cause the at least one programmable processor to send the first segment from the recipient computing device to the separate computing device for processing comprises one or more instructions to cause the at least one programmable processor to:

send the first segment from the recipient computing device to the separate computing device for processing using an adapted language model that is one or more of: time sensitive, and location sensitive.

17. A computer program product comprising a non-transitory computer-readable storage medium storing instructions that, when executed by a computing system comprising at least one programmable processor, cause the computing system to perform operations comprising:

receiving, at a recipient computing device, a speech utterance;

dynamically determining a confidence threshold value and an audio quality threshold value based on environmental conditions at which the recipient computing device is located, the environmental conditions comprising one or more of: a type of environment in which the recipient computing device is located, availability of noise cancelling devices at the recipient computing device, and number of microphones used by the recipient computing device;

segmenting the speech utterance into two or more speech utterance segments, including performing an initial analysis on the speech utterance, to determine where to perform speech recognition processing for each of the two or more speech utterance segments, by applying to the speech utterance a dynamically adaptable acoustic model implemented at the recipient computing device, with the dynamically adaptable acoustic model adjusted based on locally available data at the recipient computing device, including a user location and time, to determine a confidence score and an audio quality metric for each of the two or more speech utterance segments;

assigning, based on the initial analysis performed by the adaptable acoustic model generating the determined confidence score and audio quality metric for the each of the two or more speech utterance segments, and based on the dynamically determined confidence threshold and the audio quality threshold, a first segment from the two or more speech utterance segments to a first speech recognizer implemented on a separate computing device than the recipient computing device, and a second segment from the two or more speech utterance segments to a second speech recognizer implemented on the recipient computing device;

sending the first segment from the recipient computing device to the separate computing device for processing;

receiving first segment processing results back from the separate computing device, the sending and the receiving occurring via a data network;

processing the second segment at the recipient computing device to generate second segment processing results; and returning a completed speech recognition result assembled from the first segment processing results and the second segment processing results.

18. The computer program product of claim 17, wherein assigning the first segment and the second segment comprises:

designating the first segment for processing by the first speech recognizer when at least one of the confidence score and the audio quality metric for the first segment, determined using the dynamically adaptable acoustic model, is below the respective confidence threshold value and the audio quality threshold value; and designating the second segment of the two or more speech utterance segments for processing by the second speech recognizer when another confidence score and another audio quality metric for the second segment, determined using the dynamically adaptable acoustic model, is above the respective confidence threshold value and the audio quality threshold value.

19. The computer program product of claim 17, wherein the instructions comprise further instructions to cause the at least one programmable processor to perform further operations comprising:
- determining an amount of an available bandwidth between the recipient computing device and the separate computing device;
- wherein segmenting the speech utterance further comprises:
  - segmenting, upon determining that the available bandwidth is sufficient, the speech utterance into the two or more speech utterance segments, including performing the initial analysis for further identifying features of the speech utterance that can be more efficiently processed by the separate computing device than the recipient computing device.

20. The computer program product of claim 19, wherein identifying of the features of the speech utterance comprises:
- determining processing speeds associated with the separate computing device and the recipient computing device, the available bandwidth, and a presence of a word or phrase capable of being efficiently modeled by a context-free grammar at the recipient computing device.

* * * * *